(12) United States Patent
Moyal et al.

(10) Patent No.: US 12,190,167 B2
(45) Date of Patent: Jan. 7, 2025

(54) DECENTRALIZED CLOUD SERVICE ASSESSMENT

(71) Applicant: INTERNATIONAL BUSINESS MACHINES CORPORATION, Armonk, NY (US)

(72) Inventors: Shailendra Moyal, Pune (IN); Akash U. Dhoot, Pune (IN); Rojan Jose, Apex, NC (US); Venkata Vara Prasad Karri, Visakhapatnam (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 653 days.

(21) Appl. No.: 17/306,532

(22) Filed: May 3, 2021

(65) Prior Publication Data

US 2022/0350672 A1 Nov. 3, 2022

(51) Int. Cl.
*G06F 9/50* (2006.01)
*H04L 9/00* (2022.01)
*H04L 9/06* (2006.01)
*H04L 9/30* (2006.01)

(52) U.S. Cl.
CPC .......... *G06F 9/5072* (2013.01); *G06F 9/505* (2013.01); *H04L 9/0643* (2013.01); *H04L 9/30* (2013.01); *H04L 9/50* (2022.05)

(58) Field of Classification Search
CPC .................. G06F 9/5072; G06F 9/505; G06F 2201/835; G06F 11/0709; G06F 11/0769; G06F 11/0775; G06F 11/3006; G06F 11/323; G06F 11/3409; H04L 9/0643;
(Continued)

(56) References Cited

U.S. PATENT DOCUMENTS

| 2013/0060945 A1* | 3/2013 | Allam ................ G06F 9/50 709/226 |
| 2014/0298368 A1* | 10/2014 | Raman ............. H04L 9/3228 725/25 |
| 2015/0363851 A1 | 12/2015 | Stella et al. |

(Continued)

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.
(Continued)

*Primary Examiner* — Jorge A Chu Joy-Davila
(74) *Attorney, Agent, or Firm* — CUENOT, FORSYTHE & KIM, LLC

(57) ABSTRACT

Decentralized cloud service assessment includes using a self-executing data structure, an error confirmation capsule (ECC) generated in response to a cloud service failure experienced by a cloud service client (CSC). One or more technical performance indicia corresponding to the cloud service failure are extracted from the ECC in response to the validating. The one or more technical performance indicia are compared to one or more electronically stored predefined performance norms of a cloud service provider (CSP) associated with the cloud service failure. Based on the comparing, a comparative ranking of the CSP is determined. A graphical user interface display is generated based on comparative rankings of the CSP and one or more other CSPs.

20 Claims, 5 Drawing Sheets

(58) Field of Classification Search
CPC ......... H04L 9/30; H04L 9/50; H04L 63/0442; H04L 9/3247
See application file for complete search history.

(56) References Cited

U.S. PATENT DOCUMENTS

| | | | | |
|---|---|---|---|---|
| 2019/0130345 | A1* | 5/2019 | Antor | G06Q 10/0833 |
| 2020/0142681 | A1* | 5/2020 | Marks | G06F 11/3051 |
| 2020/0252410 | A1* | 8/2020 | Casey | G06F 16/27 |
| 2020/0327434 | A1* | 10/2020 | Maeser | H04L 41/145 |
| 2021/0374000 | A1* | 12/2021 | Chhabra | H04W 12/10 |

OTHER PUBLICATIONS

Somu, N. et al., "A computational model for ranking cloud service providers using hypergraph based techniques," Future Generation Computer Systems, Mar. 2017, vol. 1, No. 68, pp. 14-30.

Fan, W.J. et al., "A multi-dimensional trust-aware cloud service selection mechanism based on evidential reasoning approach," International Journal of Automation and Computing, Apr. 1, 2015, vol. 12, No. 2, pp. 208-219.

Noor, T.H. et al., "CloudArmor: Supporting reputation-based trust management for cloud services," IEEE Transactions on Parallel and Distributed Systems, Mar. 4, 2015, vol. 27, No. 2, pp. 367-380.

Supriya, M. et al., "Comparison of cloud service providers based on direct and recommended trust rating," In 2013 IEEE International Conference on Electronics, Computing and Communication Technologies, Jan. 17, 2013, pp. 1-6.

Garg, S.K. et al., "Smicloud: A framework for comparing and ranking cloud services," In 2011 Fourth IEEE International Conference on Utility and Cloud Computing, Dec. 5, 2011, pp. 210-218.

Debe, M. et al., "Towards a blockchain-based decentralized reputation system for public fog nodes," In 2019 IEEE/ACS 16th International Conference on Computer Systems and Applications (AICCSA), Nov. 3, 2019, pp. 1-6.

* cited by examiner

DECENTRALIZED CLOUD SERVICE ASSESSMENT

BACKGROUND

This disclosure relates to cloud-based computing, and more particularly, to using aggregated technical performance metrics to assess cloud services.

Cloud-based computing is the provisioning of computer resources (hardware and software) as services delivered over the Internet, or "the cloud." Cloud-based computing services, or simply cloud services, provide distinct advantages for a wide range of cloud service users, from individual users to large organizations. For example, a user can avoid purchases that lock the user into hardware or software that may soon be outdated, utilizing instead the latest hardware or software delivered as a service. As a service, the computing resources can be scaled up or down as the user's demand fluctuates. Rapid innovation, flexibility, and scalability are some of the advantages of cloud services that have led to a shift in the way individuals, businesses, and other organizations utilize computing technology.

SUMMARY

In an example implementation, a computer-implemented process for assessing cloud services includes validating, using a self-executing data structure, an error confirmation capsule generated in response to a cloud service failure experienced by a cloud service client. The process includes extracting from the error confirmation capsule, in response to the validating, one or more technical performance indicia corresponding to the cloud service failure. The process includes comparing the one or more technical performance indicia to one or more electronically stored predefined performance norms of a cloud service provider associated with the cloud service failure. The process includes determining, based on the comparing, a comparative ranking of the cloud service provider and generating a graphical user interface display based on comparative rankings of the cloud service provider and one or more other cloud service providers.

In another example implementation, a system for assessing cloud services includes a processor configured to initiate operations. The operations include validating, using a self-executing data structure, an error confirmation capsule generated in response to a cloud service failure experienced by a cloud service client. The operations include extracting from the error confirmation capsule, in response to the validating, one or more technical performance indicia corresponding to the cloud service failure. The operations include comparing the one or more technical performance indicia to one or more electronically stored predefined performance norms of a cloud service provider associated with the cloud service failure. The operations include determining, based on the comparing, a comparative ranking of the cloud service provider and generating a graphical user interface display based on comparative rankings of the cloud service provider and one or more other cloud service providers.

In another example implementation, a computer program product includes one or more computer readable storage media, and program instructions collectively stored on the one or more computer readable storage media. The program instructions are executable by computer hardware to initiate operations. The operations include validating, using a self-executing data structure, an error confirmation capsule generated in response to a cloud service failure experienced by a cloud service client. The operations include extracting from the error confirmation capsule, in response to the validating, one or more technical performance indicia corresponding to the cloud service failure. The operations include comparing the one or more technical performance indicia to one or more electronically stored predefined performance norms of a cloud service provider associated with the cloud service failure. The operations include determining, based on the comparing, a comparative ranking of the cloud service provider and generating a graphical user interface display based on comparative rankings of the cloud service provider and one or more other cloud service providers.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
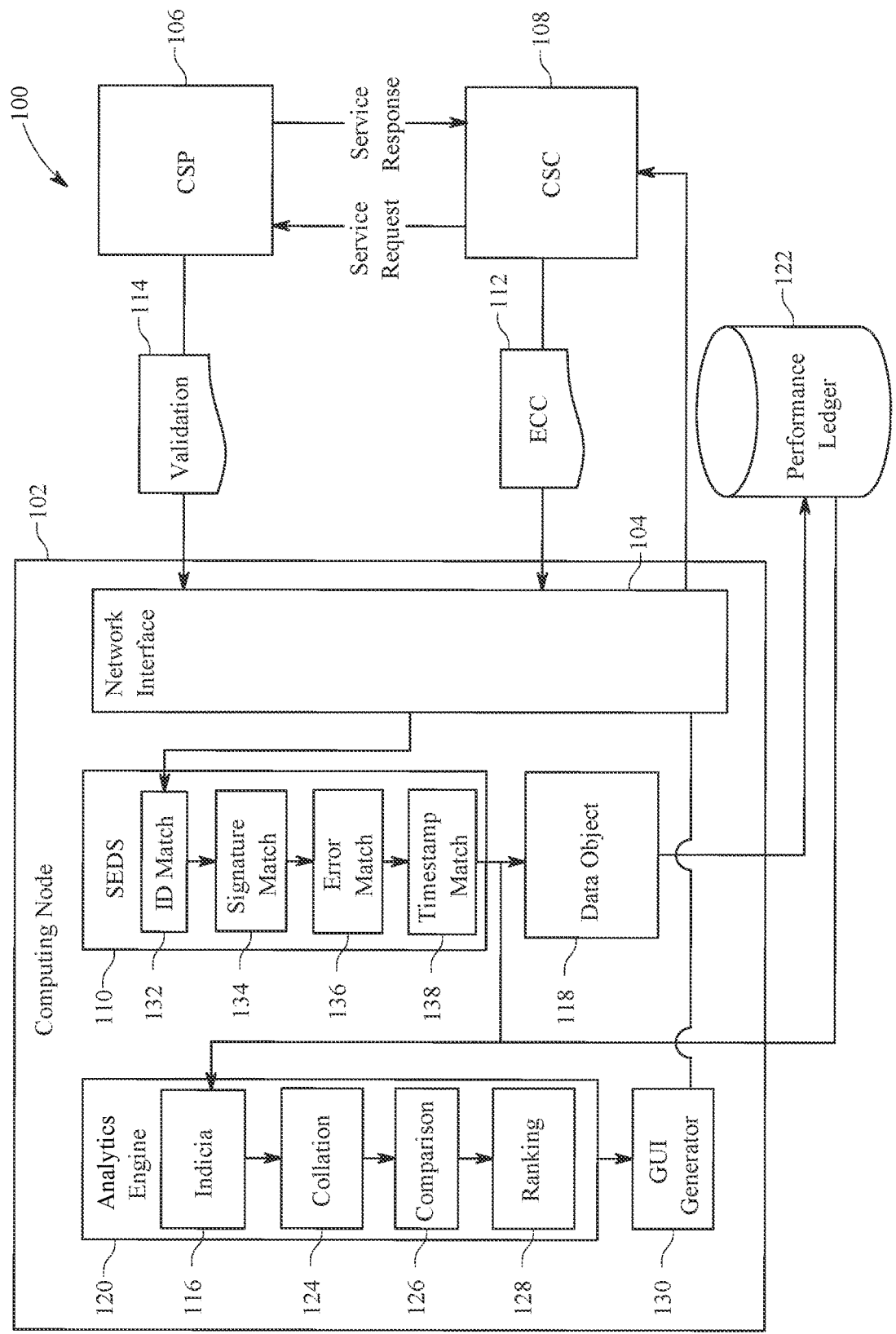
FIG. 1 is a block diagram of an example system for assessing cloud services.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to cloud-based computing, and more particularly, to using aggregated technical performance metrics to assess cloud services. Notwithstanding the numerous advantages offered by cloud services, providing reliable assessments of different cloud services has proven to be stubbornly problematic. A cloud service assessment is often based on information provided by the cloud service provider (CSP) that provides the cloud service or testimonials of one or more cloud service clients (CSCs) that have used the cloud service. CSP-provided information may only provide a one-sided view that does not give a complete picture of the CSC experience. Testimonials, blogs, and the like are often based on users' ad hoc observations rather than system-generated data.

Moreover, apart from issues of reliability, a potential CSC wishing to analyze a cloud service typically confronts the task of manually gathering and analyzing whatever data may be available from multiple sources. The task is made even more burdensome if the user wishes to undertake a comparative analysis of multiple competing cloud services provided by multiple cloud service providers.

The example processes, systems, and computer program products disclosed herein provide fully automated mechanisms for reliably assessing cloud services based on data generated by the cloud services themselves during the actual performance of the cloud services. In accordance with the inventive arrangements described herein, trusted, transparent, and immutable assessments of cloud services are made based on data objects automatically generated in response to specific cloud service events. The example processes, systems, and computer program products disclosed herein can affirmatively detect and notify to relevant entities a cloud service degradation. Detection and notification can be performed in real time.

In one or more example implementations, a cloud service assessment system auto-performs (defined herein as performance of an action automatically and independently of human interaction or intervention) analyses of technical performance data automatically generated in response to various cloud service events, such as a cloud service failure. Technical performance data includes technical performance indicia associated with and descriptive of a cloud service failure. Examples of technical performance indicia include error codes, header codes, response codes, service downtimes, API error occurrences, service unavailability logs comprising timestamps and the reason for failure, other such indicia, as well as the frequency of occurrence of events corresponding to cloud service failures. Based on the auto-performed analyses of technical performance indicia, the system can generate a comparative ranking of CSPs and the various cloud services each provides.

By auto-performing the analyses based on technical performance indicia that is automatically generated in response to cloud service failures and retrieved via a data communications network, the system can capture and analyze the reasons for cloud service failures due to changing conditions and variables. Thus, as new cloud services are introduced, as existing ones are improved, or their performance degrades, the system can dynamically revise the CSPs' comparative rankings. The system can perform a classification algorithm based on the dynamic analyses to generate insights into what changes may be made by administrators to improve the performance of the cloud services.

In some arrangements, the system is implemented as a blockchain-enabled network of CSPs and CSCs, which can create connectivity and validation among computing nodes used by the CSPs to provision cloud services and used by the CSCs to access the cloud services. The security provided by the blockchain-enabled network mitigates the likelihood of adverse effects of external APIs, so-called super cookies, malware, and other malicious intrusions into cloud services provided to CSCs by the CSPs. This security aspect can reduce CSPs' reluctance to share technical performance indicia with existing and prospective CSCs. CSPs, with such security, may be motivated to provide data in order to maintain or enhance the CSPs' reputation for reliably provisioning cloud services.

The system provides CSCs with comparative rankings of various cloud services provided by a variety of different CSPs. In certain arrangements, the comparative ranking of cloud services provided by different CSPs can be specific to an individual CSC. CSC-specific rankings can be tailored to reflect preferences and/or technical requirements of the CSC. The preferences and requirements can be derived by monitoring the cloud services used by the CSC. Alternatively, or additionally, the preferences and requirements can be determined from explicit input from the CSC using, for example, a graphical user interface (GUI), such as an interactive dashboard.

In certain arrangements, the system generates an evaluation summary of various benchmarks (e.g., technical performance indicia) and/or rankings determined for each of various cloud services provisioned by multiple CSPs, the benchmarks and/or rankings corresponding to various cloud service features and attributes published or documented as part of the CSPs' service level agreements (SLAs). Comparative rankings determined by the system can correspond to various aspects of the cloud services provisioned by the CSPs. These aspects include, but are not limited to, technical performance, security, cost, availability, scalability, infrastructure, and the like of each of the various cloud services.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

Figure 2:
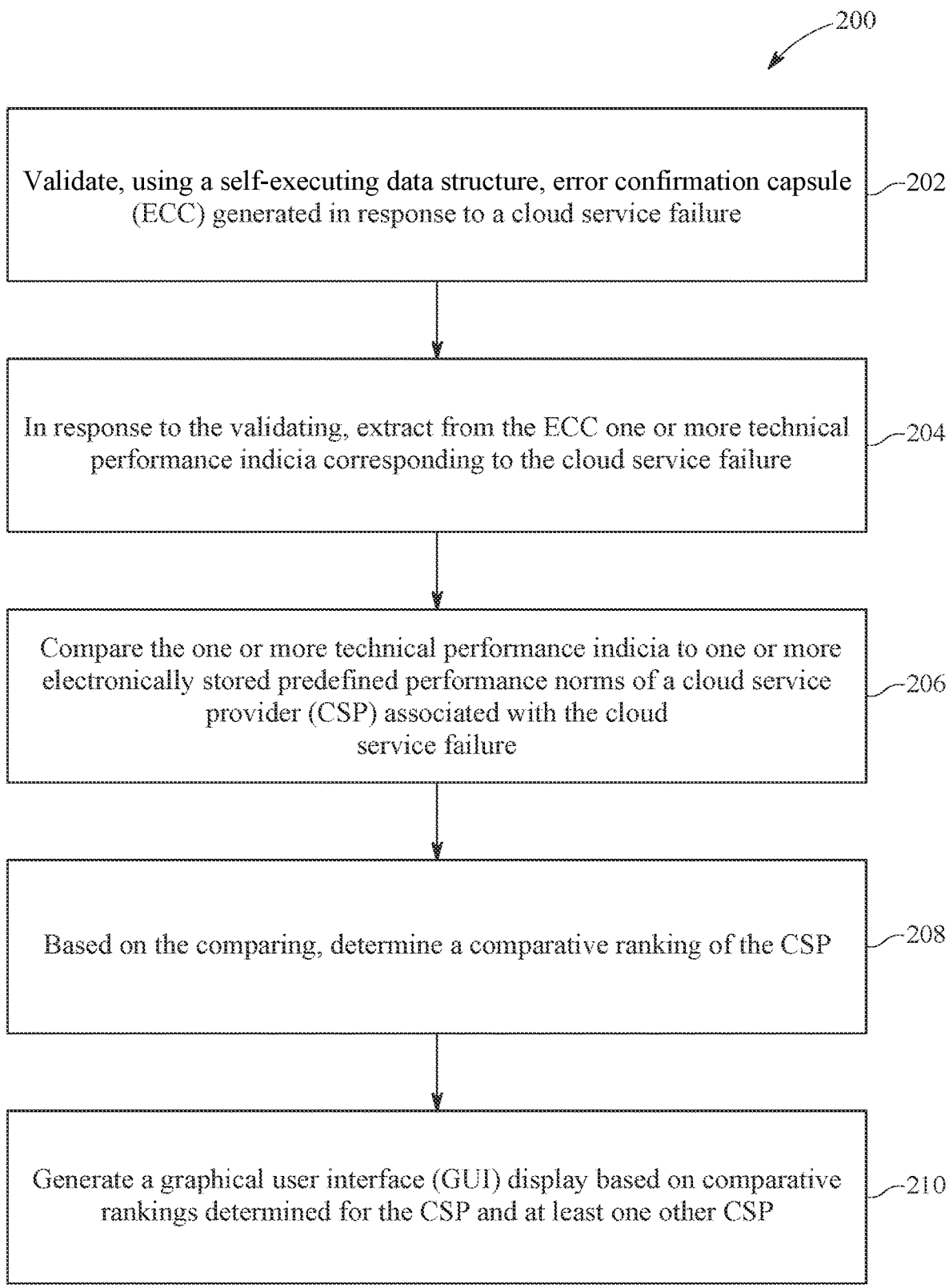
FIG. 2 is a flow chart of an example process for assessing cloud services using the example system of FIG. 1.
Figure 3:
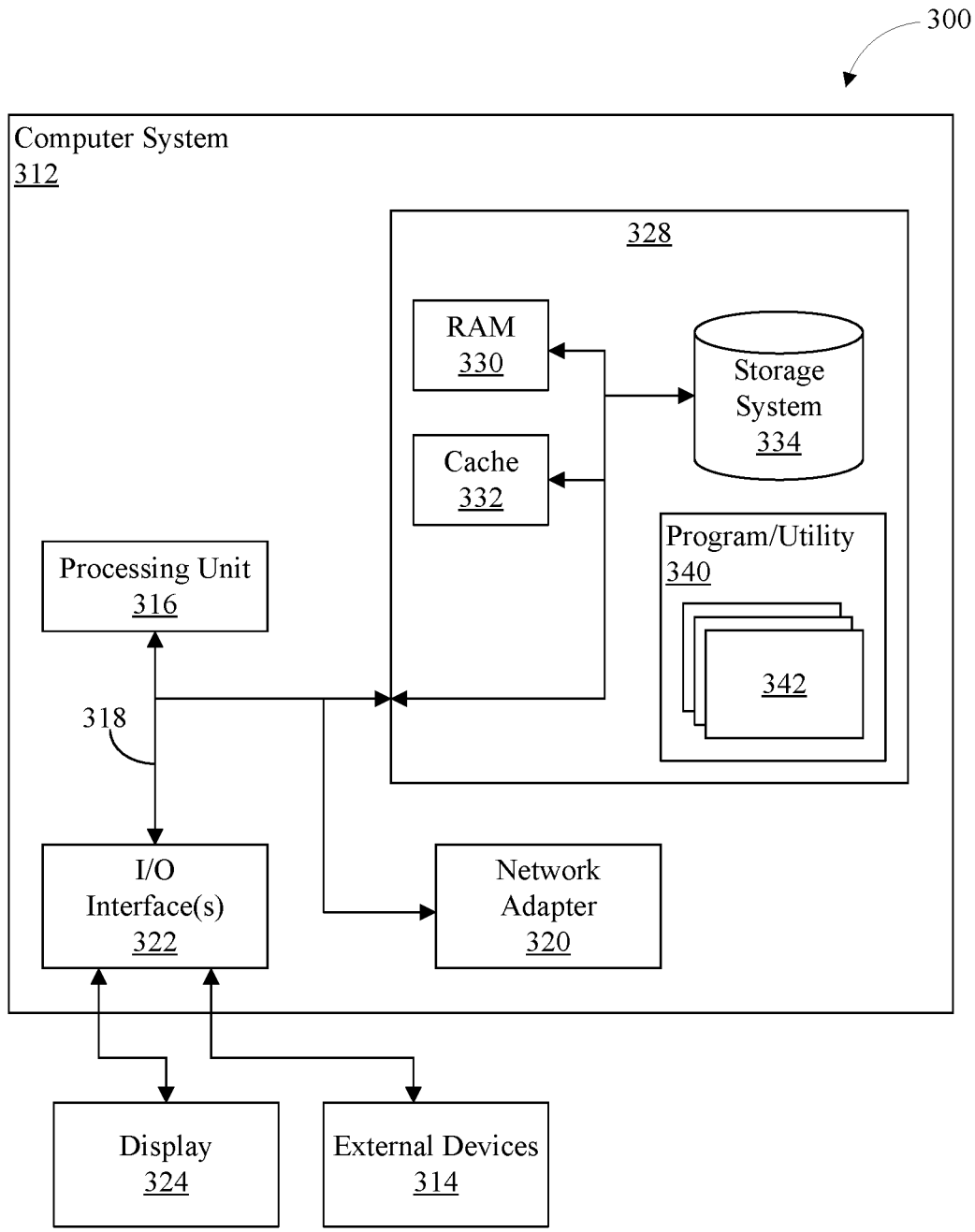
FIG. 3 is a block diagram of an example computer system for implementing the example system of FIG. 1.

FIGS. 1 and 2, respectively, illustrate example cloud-service assessment system (system) 100 and methodology 200 for monitoring, recording, and assessing technical performance indicia associated with the provisioning of a cloud service by multiple cloud service providers. Based on an assessment of the technical performance indicia, system 100 generates comparative rankings of the different cloud service providers. Illustratively, system 100 is implemented in computing node 102, which communicatively couples through network interface 104 via a data communications network (e.g., Internet) with other networked computing nodes. Two such communicatively coupled computing nodes are explicitly shown. One is cloud service provider (CSP) 106. The other is cloud service client (CSC) 108. Although not explicitly shown, it is to be understood that other CSPs and CSCs likewise can communicatively couple with system 100 through network interface 104. In various arrangements, system 100 can be implemented in various types of computer systems such as computer system 312, which is part of example computing node (e.g., cloud-based server) 300 (FIG. 3).

At block 202, system 100 using self-executing data structure (SEDS) 110 validates error confirmation capsule (ECC) 112. EEC 110 is automatically generated in response to the failure of a cloud service requested by CSC 108 and provided in response thereto by CSP 106. The cloud service, for example, can comprise an API invoked by CSC 108 with an http(s) request submitted via the data communications network. The API, in the event of failure, automatically conveys to CSC 108 data including an error code and error description corresponding to the cloud service failure, the data contained in ECC 112, which can be embedded in a response header. Thus, the data contained in ECC 112 can provide various technical details (technical performance indicia) pertaining to the cloud service failure.

The technical performance indicia contained in ECC 112 can vary depending on the nature and point of failure of the cloud service. The details optionally include a service API signature (if the cloud service is provisioned as an API), an invoker identification, invocation timestamp, as well as error code and error description. The point of the cloud service failure can occur anywhere in the network service layer such as an application server, web server, load balancer, network address translation (NAT), or gateway. If certain aspects of the cloud service are hosted by one or more third parties on behalf of CSP 106, the third parties can be authorized by CSP 106 to deliver ECC 112 to CSC 108. CSC 108 can convey the ECC 112 to system 100 via a network connection to network interface 104.

SEDS 110 validates ECC 112 only in response to receipt of validation 114 conveyed to system 100 via a data communications network through network interface 104. Validation 114 is conveyed by CSP 106 or a third party authorized by CSP 106 to validate ECC 112. Validation 114 can be conveyed to relevant entities in real time. System 100 can discard ECC 112 if validation 114 is not received. ECC 112 can be automatically discarded by system 100 if validation 114 is not received within a predetermined time interval.

In accordance with certain arrangements described in detail below, SEDS 110 can validate ECC 112 based on data extracted from validation 114. Any discrepancy between the technical performance indicia conveyed by ECC 112 and data extracted from validation 114 can indicate a cloud service failure attributable not to CSP 106 or an authorized third party but rather owing to a malicious intrusion by a third-party attacker using external APIs, super cookies, malware, or the like. In the event of a third-party attack, system 100 analyzes the detected discrepancies to define the nature of various security breaches in the network flow, which can be considered a distinct cloud service failure category and used to identify any subsequent security breach.

Thus, one of the benefits of ECC 112 validation by SEDS 110 is detection of malicious intrusions that cause a cloud service failure. A cloud service failure caused by such intrusion can fraudulently malign CSP 106 or diminish unfairly the reputation of CSP 106 among existing and prospective CSCs even though CSP 106 is not responsible for a cloud service failure, that results from a malicious intrusion. The security provided by the validation requirement can induce CSPs to share technical performance data to bolster and maintain the CPSs' standing among CSCs.

At block 204, in response to SEDS 110 validating of ECC 112, system 100 extracts technical performance indicia 116 from ECC 112. System 100 generates copies of technical performance indicia 116 and combines the copies with corresponding data pertaining to CSP 106 and the client service provisioned by CSP 106 to generate data object 118. System 100 passes technical performance indicia 116 to analytics engine 120 and writes data object 118 to performance ledger 122.

Performance ledger 122 compiles performance data collected in response to cloud service failures of cloud services provisioned by multiple CSPs. The compiled performance data identifies cloud services and the CSPs that provisioned the cloud services, as well as corresponding technical performance indicia associated with failures of the cloud services, such as cloud service downtime, API error occurrences, unavailability logs with corresponding error descriptions, timestamps, and the like, as well as error codes, response codes, header codes, and device and network details. The technical performance indicia can correspond to specific network nodes and further include business-as-usual (BAU) up-time, as well as frequencies of cloud service activities and events, all of which can be used in assessing technical performance of cloud services. Additionally, performance ledger 122 stores performance norms for cloud services, the performance norms established by the CSPs that provided the cloud services.

Analytics engine 120 performs collation 124 to collate predefined performance norms established by CSP 106 with the specific technical performance indicia 116 (e.g., error code, error description) extracted from ECC 112.

At block 206, analytics engine 120 performs comparison 126, comparing the one or more technical performance indicia 116 to the one or more electronically stored predefined performance norms. The performance norms, in some arrangements, are ones expressed in SLAs, which in certain arrangements system 100 identifies and extracts from SLAs electronically retrieved from network sites maintained by CSPs or from other sources. By comparing technical performance indicia 116 with the collated performance norms, analytics engine 120 determines the manner and extent to which the cloud service provisioned by CSP 106 deviates from an established performance norm owing to the cloud service failure.

Analytics engine 120 can perform collation 124 to identify cloud services identical or similar to the cloud service requested by CSC 108 and provisioned by CSP. Comparison 126 can be performed by analytics engine 120 to determine the extent and/or frequency to which the cloud services provisioned by other CSPs deviate from predetermined performance norms.

At block 208, analytics engine 120 performs ranking 128 to determine a comparative ranking of CSP 106 based on the comparisons. Analytics engine 120 determines the nature and extent to which the cloud service provisioned by CSP 106 to CSC 108 deviates from the norm and, based on comparing the extent to which one or more other CSPs' cloud services deviate from predetermined norms for provisioning the same or similar cloud services, ranks CSP 106 relative to other CSPs accordingly.

At block 210, GUI generator 130 generates a GUI. The GUI displays the comparative rankings of CSP 106 and one or more other CSPs based on the comparisons. The GUI can be conveyed through network interface 104 via a data communications network to a display screen of a CSC 108 computing node. In some arrangements, the comparative rankings can comprise icons corresponding to CSP 106 and other CSP(s), the icons arranged by GUI generator 130 according to the comparative ranking of each.

System 100, in certain arrangements, can determine rankings pertaining to a large number of CSPs based data from various CSCs acquired and analyzed as described. The rankings can be made available through an information portal accessible by various existing and potential CSCs.

Although illustratively the operative aspects of system 100 are described herein in the specific context a cloud service involving a single CSP and single CSC, the same operative aspects are performed with respect to many more CSPs and CSCs which can operatively couple to system 100 via network interface 104. Thus, as described, the arrangement of system 100 facilitates generating numerous data objects, typified by data object 118, which can be generated by SEDS 110 and electronically stored by system 100 on performance ledger 122. The comparative ranking of a single CSP, such as CSP 106, thus reflects a broad comparison the CSP with many other CSPs. System 100 can determine comparative rankings of multiple CSPs dynamically (e.g., in real time) and can provide a historical record to reflect performance metrics at different points in time.

Moreover, as each of numerous CSPs provide a wide array of client services to numerous CSCs, numerous corresponding data objects are generated and stored on performance ledger 122. These data objects provide the basis for dynamic comparative rankings. That is, comparative rankings that change as underlying technical circumstances change, whether for the better or the worse. For example, one CSP may make technical revisions that reduce the frequency of failures of the cloud services that the CSP provides. Conversely, for example, other CSPs may introduce new cloud services that reduce the comparative rankings of older ones, which by comparison perform less satisfactorily. System 100 can capture the dynamic changes based on technical performance indicia regularly received by monitoring data received via network interface 104 from multiple CSPs and CSCs.

Some attributes of the same cloud service may be relatively more important to some CSCs than to others. Different CSCs therefore may place emphasis on different attributes of a cloud service. For example, with respect to a specific cloud service, one CSC may place emphasis on the frequency of downtimes or interruptions of the cloud service whereas another CSC may place emphasis on the frequency of security failures. For still other CSCs, other types of failures of the cloud service may be more significant. Accordingly, in certain arrangements, system 100 performs one or more classification algorithms that link technical performance indicia, such as technical performance indicia 116, to the CSC based on preference or performance requirements of a specific CSC. In some arrangements, system 100 identifies one or more preference or performance requirements of CSC 108 based on monitoring, periodically and/or in real time, the computer system of CSC 108. System 100 can identify preferences and/or performance requirements of CSC 108 based on the cloud services requested by CSC 108 from CSP 106 and/or other CSPs, as well as requirements specified by the requests.

In accordance with some arrangements, the specific requirements of one or more cloud services used by CSC 108 can be ascertained based on specific processing attributes routinely needed by entity type. For example, cloud service attributes of a CSC that is a banking entity typically include a high degree of scalability with one or more secure data channels within specific timeframes based on load. Thus, for such an entity, the CSC's cloud service requirements can include a secure data zone with scalable user-service interfaces, which scale up and down concomitantly with load increases and decreases. Correspondingly, ECCs can be captured from data-access information and information can be validated by relevant stakeholders (e.g., CSCs) for determining whether the cloud service satisfies the requirements and to what degree. With an increase in load, service scalability and failure of a response to a cloud service request can be captured, enabling a better understanding of the cloud service performance given the specific scenario. Other cloud service performance indicia such as CPU load, memory congestion, network flow, and the like, also can be captured for determining whether the cloud service infrastructure is supportive of a particular requirement.

In other arrangements, GUI generator 130 generates an interactive GUI that enables CSC 108 (e.g., through an administrator or other user) to rank different performance requirements or specify technical preferences for cloud services used by CSC 108. In certain arrangements, system 100 based on system monitoring and user interactions derives a user experience 2D/3D model. The specific 2D/3D model with user interfaces can be provided in accordance with the selection of requirements by CSC 108. For example, in the context of a CSC that is an entity type as described above, the GUI can present different scalable models and data deployment models with an interaction diagram between service and data representation such that the CSC can validate and design a corresponding architecture diagram corresponding to the performance requirements or technical preferences for cloud services used. GUI generator 130 can overlay on the interactive GUI data derived by system 100 based on system monitoring.

The GUI generated by GUI generator 130, in accordance with the arrangements, can be an interactive dashboard that enables the user to select among various cloud services based on system-derived metrics. System 100 determines specific requirements to satisfy user-specified criteria based on the metrics, and based on the determined requirements, creates an integrated cloud-based solution as a preliminary architectural step for integrating services provided by various CSPs.

System 100 optionally implements a classification algorithm for classifying the various dynamically captured data, described above, and the type of networks over which cloud services are conveyed by various CSPs. Based on the classifying, system 100 generates and conveys recommendations to the various CSPs for improving the cloud services provided. System 100 can convey the recommendations to CSPs through network interface 104 via a data communications network. Information captured in response to a cloud service failure and contained in ECC 112 can be classified with different attributes of the cloud service provisioned by CSP 106 at a particular instance. The classifications can be further used to predict the reliability of CSP 106 if subsequently such a cloud service failure again occurs. System 100 can convey recommendations to CSP 106 pertaining to the improvements needed in such instances based on learnings gleaned in different scenarios.

In certain arrangements, SEDS 110 is implemented as a smart contract running on a blockchain of cryptographically linked data blocks corresponding to ECC 112. Accordingly, SEDS 110 can execute a predetermined transaction—which in the current context is a proposed write of ECC 112 to performance ledger 122—upon the occurrence of a defined event, the event being validation of ECC 112. Operatively, in response to a cloud service failure, CSP 106 generates a failure response that is conveyed via a data communications network to CSC 108. CSC 108 extracts ECC 112, which is encrypted, from the failure response and passes ECC 112 to SEDS 110. SEDS 110 decrypts ECC 112. In some arrangements public-key encryption is used to encrypt ECC 112, and SEDS 110 uses a public key corresponding to CSP 106 obtained from a key store of CSP 106 to decrypt ECC 112.

SEDS 110 validates ECC 112 by a comparison of ECC 112 with data provided to the blockchain by CSC 108. CSC 108 can extract the data from validation 114 conveyed via a data communications network by CSP 106 to CSC 108. The data can include an invoker ID, signature, error code, error description, and timestamp for validating ECC 112. Referring still to FIGS. 1 and 2, SEDS 110 performs ID match 132 to determine whether IDs corresponding to ECC 112 and one provided by CSC 108 match. SEDS 110 performs signature match 134 to confirm that signatures corresponding to CSP 106 and CSC 108 match. SEDS 110 performs error match 136 to determine whether the error code and corresponding description of ECC 112 match those provided by CSC 108. SEDS 110 performs timestamp match 138 to determine whether the timestamp assigned to the cloud service failure that invoked ECC 112 matches that provided by CSC 108. SEDS 110 validates ECC 112 in response to an affirmative match of each the items. In other arrangements, different validation procedures are performed by SEDS 110 to validate ECC 112. Only upon validation of ECC 112 is data object 118 (derived from ECC 112) generated, passed to, and electronically stored on performance ledger 122. Optionally, validation is necessary for passing technical performance indicia 116 extracted from ECC 112 to analytics engine 120.

FIG. 3 is a schematic of example computing node 300. In one or more arrangements, computing node 300 typifies a suitable cloud computing node. Computing node 300 is not intended to suggest any limitation as to the scope of use or functionality of arrangements of the arrangements described herein. Computing node 300 illustrates hardware elements for performing any of the functionality described within this disclosure.

Computing node 300 includes a computer system 312, which is operational with numerous other general-purpose or special-purpose computing system environments or configurations. Examples of well-known computing systems, environments, and/or configurations that may be suitable for use with computer system 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 312 may be described in the general context of computer system-executable instructions, such as program modules, being executed by a computer system. Generally, program modules may include routines, programs, objects, components, logic, data structures, and so on that perform specific tasks or implement particular abstract data types. Computer system 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system 312 is shown in the form of a general-purpose computing device. The components of computer system 312 may include, but are not limited to, one or more processors 316, a memory 328, and a bus 318 that couples various system components including memory 328 to processor 316. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The carrying out of instructions of a computer program by a processor comprises executing or running the program. As defined herein, "run" and "execute" comprise a series of actions or events performed by the processor in accordance with one or more machine-readable instructions. "Running" and "executing," as defined herein refer to the active performing of actions or events by the processor. The terms run, running, execute, and executing are used synonymously herein.

Bus 318 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 312 typically includes a variety of computer system-readable media. Such media may be any available media that is accessible by computer system 312, and may include both volatile and non-volatile media, removable and non-removable media.

Memory 328 may include computer system readable media in the form of volatile memory, such as random-access memory (RAM) 330 and/or cache memory 332. Computer system 312 may further include other removable/non-removable, volatile/non-volatile computer system storage media. By way of example, storage system 334 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of arrangements of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of arrangements of the invention as described herein. For example, one or more of the program modules may include a cloud-service assessment system, such as system 100, or portions thereof.

Program/utility 340 is executable by processor 316. Program/utility 340 and any data items used, generated, and/or operated upon by computer system 312 are functional data structures that impart functionality when employed by computer system 312. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 312 may also communicate with one or more external devices 314 such as a keyboard, a pointing device, a display 324, etc.; one or more devices that enable a user to interact with computer system 312; and/or any devices (e.g., network card, modem, etc.) that enable computer system 312 to communicate with one or more other computing devices. Such communication can occur via input/output (I/O) interfaces 322. Still, computer system 312 can communicate with one or more networks such as a local area network (LAN), a general wide area network (WAN), and/or a public network (e.g., the Internet) via network adapter 320. As depicted, network adapter 320 communicates with the other components of computer system 312 via bus 318. It is to be understood that although not shown, other hardware and/or software components could be used in conjunction with computer system 312. Examples, include, but are not limited to, components such as microcode, device drivers, redundant processing units, external disk drive arrays, RAID systems, tape drives, and data archival storage systems, etc.

Computing node 300 is an example of computer hardware and may include fewer components than shown or additional components not illustrated in FIG. 3 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

It is expressly noted that although this disclosure includes a detailed description of cloud computing, implementations of the teachings recited herein are not limited to a cloud computing environment. Rather, arrangements of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
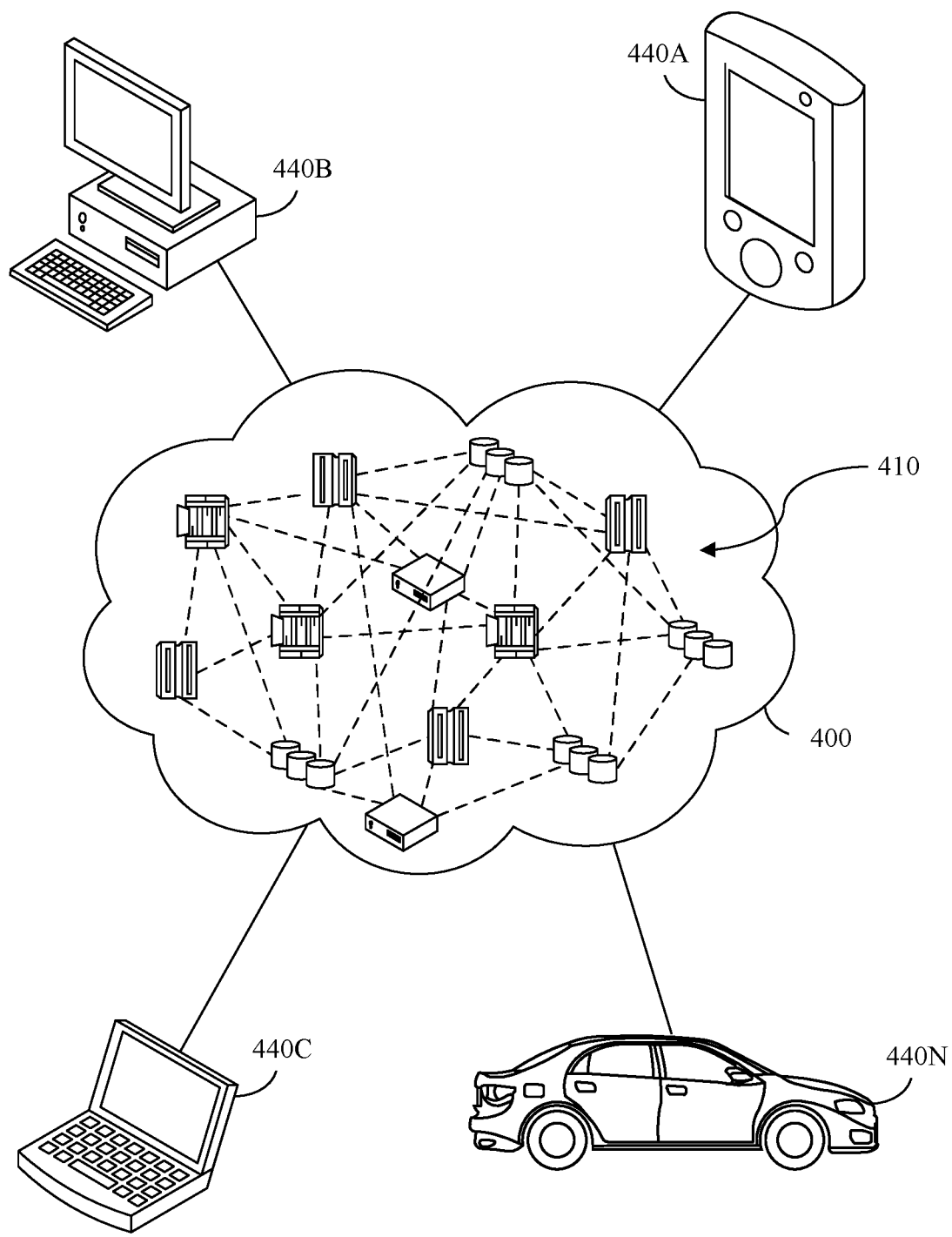
FIG. 4 is a block diagram of an example cloud computing environment.

Referring now to FIG. 4, illustrative cloud computing environment 400 is depicted. As shown, cloud computing environment 400 includes one or more cloud computing nodes 410 with which local computing devices used by cloud consumers, such as, for example, personal digital assistant (PDA) or cellular telephone 440a, desktop computer 440b, laptop computer 440c, and/or automobile computer system 440n may communicate. Computing nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 440a-n shown in FIG. 4 are intended to be illustrative only and that computing nodes 410 and cloud computing environment 400 can communicate with any type of computerized device over any type of network and/or network addressable connection (e.g., using a web browser).

Figure 5:
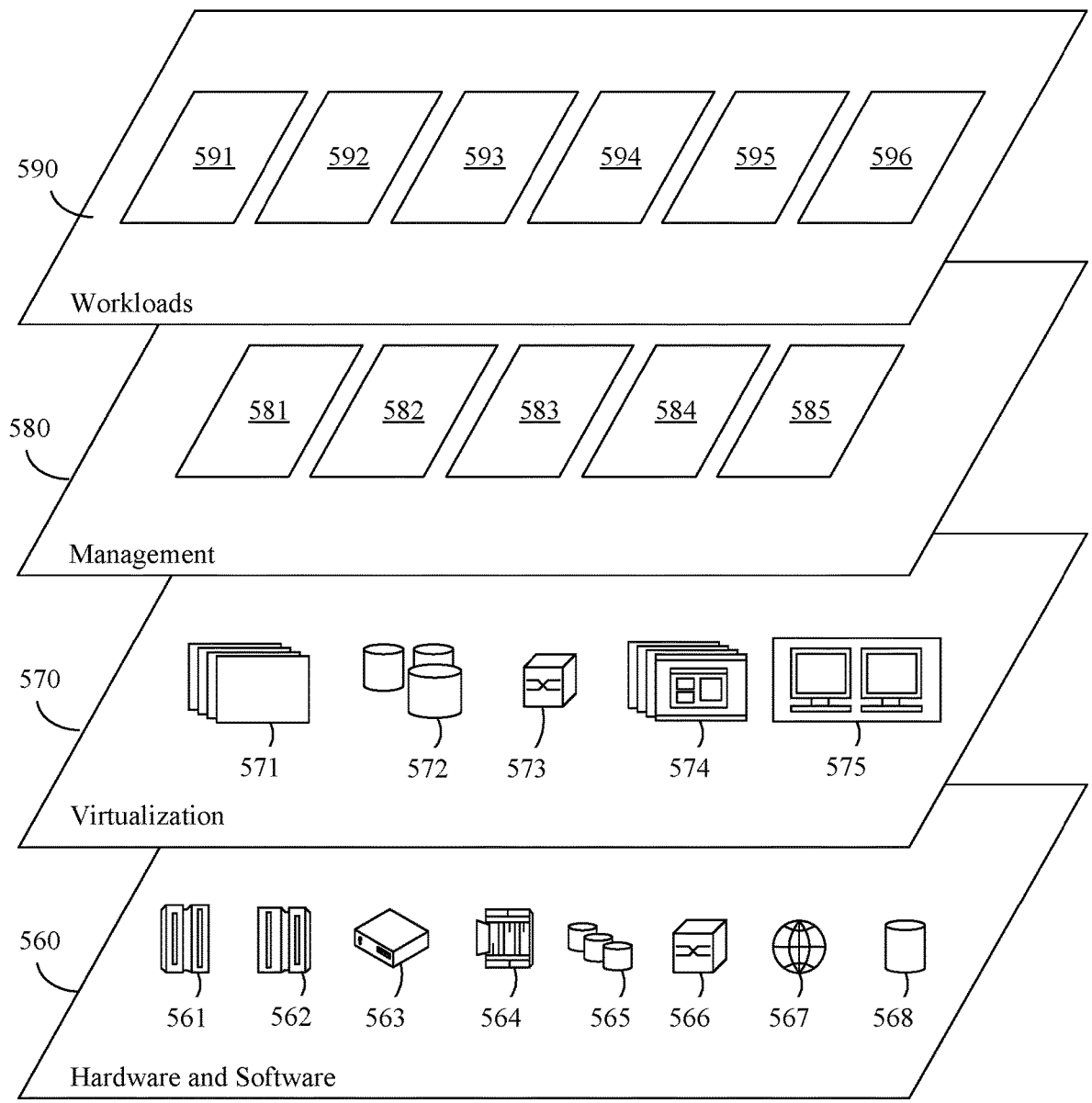
FIG. 5 is block diagram of example abstraction model layers.

Referring now to FIG. 5, a set of functional abstraction layers provided by cloud computing environment 400 (FIG. 4) is shown. It should be understood in advance that the components, layers, and functions shown in FIG. 5 are intended to be illustrative only and arrangements of the invention are not limited thereto. As depicted, the following layers and corresponding functions are provided:

Hardware and software layer 560 includes hardware and software components. Examples of hardware components include mainframes 561; RISC (Reduced Instruction Set Computer) architecture-based servers 562; servers 563; blade servers 564; storage devices 565; and networks and networking components 566. In some arrangements, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and cloud-service assessment system 596.

The terminology used herein is for the purpose of describing particular arrangements only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "blockchain" refers to a distributed ledger system that promotes decentralization, transparency, and data integrity and that comprises a time-stamped series of immutable records of data that are managed by multiple computers not owned or otherwise exclusively controlled by any single entity.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one arrangement," "an arrangement," "in one or more arrangements," "in particular arrangements," or similar language mean that a particular feature, structure, or characteristic described in connection with the arrangement is included in at least one arrangement described within this disclosure. Thus, appearances of the aforementioned phrases and/or similar language throughout this disclosure may, but do not necessarily, all refer to the same arrangement.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the term "user" refers to a human being. Relatedly, a CSP and CSC refers to an individual user or organized group of users (e.g., business enterprise or other organization) who use cloud services or perform tasks related to the provisioning of cloud services.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some arrangements, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to arrangements of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various arrangements of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various arrangements of the present invention have been presented for purposes of illustration and are not intended to be exhaustive or limited to the arrangements disclosed. Many modifications and variations will be apparent to those of ordinary skill in the art without departing from the scope and spirit of the described arrangements. The terminology used herein was chosen to best explain the principles of the arrangements, the practical application or technical improvement over technologies found in the marketplace, or to enable others of ordinary skill in the art to understand the arrangements disclosed herein.

What is claimed is:

1. A computer-implemented process, comprising:
receiving, responsive to a cloud service failure of a cloud service provided by a cloud service provider (CSP), an error confirmation capsule (ECC) from a cloud service client (CSC) experiencing the cloud service failure;
validating, using a self-executing data structure and after receiving the ECC, the ECC;
in response to the validating, extracting from the ECC one or more technical performance indicia describing characteristics of the cloud service failure of the cloud service;
comparing the one or more technical performance indicia to one or more electronically stored predefined performance norms of the CSP associated with the cloud service failure; and
based on the comparing, determining a comparative ranking of the CSP relative to at least one other CSP, wherein
the self-executing data structure is implemented as a smart contract running on a blockchain of cryptographically linked data blocks corresponding to the ECC,
the CSC is configured to:
select a new CSP using the comparative ranking, and execute a cloud service provided by the new CSP.

2. The computer-implemented process of claim 1, wherein
the validating is performed only after a validation is received from the CSP providing the cloud service or a third party authorized by the CSP, and
the validating of the ECC is performed using data extracted from the validation.

3. The computer-implemented process of claim 2, wherein
the validating includes comparing the one or more technical performance indicia extracted from the ECC with technical performance data extracted from the validation.

4. The computer-implemented process of claim 1, wherein
the comparative ranking is based upon information collected from a plurality of different CSCs, and
the comparative ranking is for a plurality of CSPs.

5. The computer-implemented process of claim 4, wherein
the comparative ranking is specific to one of the plurality of different CSCs, and
a CSP recommendation is generated based on one or more preference or performance requirements of the one of the plurality of different CSCs.

6. The computer-implemented process of claim 4, wherein
the one or more preference or performance requirements are identified based on monitoring a computer system of the CSC.

7. The computer-implemented process of claim 1, wherein
the GUI is an interactive dashboard presented to the CSC via a data communications network.

8. A system, comprising:
a processor configured to initiate operations including:
receiving, responsive to a cloud service failure of a cloud service provided by a cloud service provider (CSP), an error confirmation capsule (ECC) from a cloud service client (CSC) experiencing the cloud service failure;
validating, using a self-executing data structure and after receiving the ECC, the error confirmation capsule (ECC) generated in response to a cloud service failure experienced by cloud service client (CSC);
in response to the validating, extracting from the ECC one or more technical performance indicia describing characteristics of corresponding to the cloud service failure of the cloud service;
comparing the one or more technical performance indicia to one or more electronically stored predefined performance norms of the cloud service provider (CSP) associated with the cloud service failure; and
based on the comparing, determining a comparative ranking of the CSP relative to at least one other CSP, wherein
the self-executing data structure is implemented as a smart contract running on a blockchain of cryptographically linked data blocks corresponding to the ECC,
the CSC is configured to:
select a new CSP using the comparative ranking, and execute a cloud service provided by the new CSP.

9. The system of claim 8, wherein
the validating is performed only after a validation is received from the CSP providing the cloud service or a third party authorized by the CSP, and
the validating of the ECC is performed using data extracted from the validation.

10. The system of claim 9, wherein
the validating includes comparing the one or more technical performance indicia extracted from the ECC with technical performance data extracted from the validation.

11. The system of claim 8, wherein
the comparative ranking is based upon information collected from a plurality of different CSCs, and
the comparative ranking is for a plurality of CSPs.

12. The system of claim 11, wherein
the comparative ranking is specific to one of the plurality of different CSCs, and
a CSP recommendation is generated based on the one or more preference or performance requirements of the one of the plurality of different CSCs.

13. The system of claim 11, wherein
the one or more preference or performance requirements are identified based on monitoring a computer system of the CSC.

14. The system of claim 8, wherein
the GUI is an interactive dashboard presented to the CSC via a data communications network.

15. A computer program product, the computer program product comprising:
- receiving, responsive to a cloud service failure of a cloud service provided by a cloud service provider (CSP), an error confirmation capsule (ECC) from a cloud service client (CSC) experiencing the cloud service failure;
- validating, using a self-executing data structure and after receiving the ECC, the error confirmation capsule (ECC) generated in response to a cloud service failure experienced by cloud service client (CSC);
- in response to the validating, extracting from the ECC one or more technical performance indicia describing characteristics of corresponding to the cloud service failure of the cloud service;
- comparing the one or more technical performance indicia to one or more electronically stored predefined performance norms of the cloud service provider (CSP) associated with the cloud service failure; and
- based on the comparing, determining a comparative ranking of the CSP relative to at least one other CSP, wherein the self-executing data structure is implemented as a smart contract running on a blockchain of cryptographically linked data blocks corresponding to the ECC,
- the CSC is configured to:
  - select a new CSP using the comparative ranking, and
  - execute a cloud service provided by the new CSP.

16. The computer program product of claim 15, wherein
- the validating is performed only after a validation is received from the CSP providing the cloud service or a third party authorized by the CSP, and
- the validating of the ECC is performed using data extracted from the validation.

17. The computer program product of claim 16, wherein
the validating includes comparing the one or more technical performance indicia extracted from the ECC with technical performance data extracted from the validation.

18. The computer program product of claim 15, wherein
- the comparative ranking is based upon information collected from a plurality of different CSCs, and
- the comparative ranking is for a plurality of CSPs.

19. The computer program product of claim 17, wherein
- the comparative ranking is specific to one of the plurality of different CSCs, and
- a CSP recommendation is generated based on the one or more preference or performance requirements of the one of the plurality of different CSCs.

20. The computer program product of claim 17, wherein
the one or more preference or performance requirements are identified based on monitoring a computer system of the CSC.

* * * * *